United States Patent [19]

Schönwald et al.

[11] 4,247,260
[45] Jan. 27, 1981

[54] PRESSURE REGULATED WATER SUPPLY SYSTEM

[75] Inventors: Siegfried Schönwald; Eberhard Breyer, both of Bad Neustadt, Fed. Rep. of Germany

[73] Assignee: Siemens Aktiengesellschaft, Munich, Fed. Rep. of Germany

[21] Appl. No.: 10,167

[22] Filed: Feb. 7, 1979

[30] Foreign Application Priority Data

Mar. 13, 1978 [DE] Fed. Rep. of Germany ....... 2810738

[51] Int. Cl.³ ............................................. E03B 11/16
[52] U.S. Cl. ..................... 417/38; 200/81 R
[58] Field of Search ........................ 417/36, 38, 43, 63; 137/568; 200/81 R

[56] References Cited

U.S. PATENT DOCUMENTS

| | | | |
|---|---|---|---|
| 3,563,671 | 2/1971 | Weber | 417/38 |
| 3,739,810 | 6/1973 | Horan | 417/38 X |
| 3,782,858 | 1/1974 | Deters | 417/38 X |
| 3,973,877 | 8/1976 | Taki | 417/38 |

FOREIGN PATENT DOCUMENTS 1459543 3/1969 Fed. Rep. of Germany ............ 417/38

*Primary Examiner*—Billy J. Wilhite
*Attorney, Agent, or Firm*—Kenyon & Kenyon

[57] ABSTRACT

A pressure regulated water supply system having an accumulator arranged between an input line supplied by a pump and an output line leading to the consumers. A diaphragm between the input line and the accumulator controls a pressure switch which turns the feed pump on and off. The diaphragm is provided with an opening of a size, relative to the delivery flow of water to the pump, such that a pressure difference occurs across it. A check valve is arranged on the side of the diaphragm facing the accumulator above the passage opening and the diaphragm itself forms the seat for the check valve. The mouth of a duct located above the surface of the diaphragm connects to the pressure switch. The distance between the mouth and the surface of the diaphragm is chosen so that, if the diaphragm is deflected due to a pressure difference, it rests against the mouth and closes it.

8 Claims, 2 Drawing Figures

PRESSURE REGULATED WATER SUPPLY SYSTEM

BACKGROUND OF THE INVENTION (a) Field of The Invention

This invention relates to a pressure regulated water supply system having an accumulator arranged between an input line and an output line leading to a consumer installation, wherein a diaphragm that can be actuated by a pressure difference is provided between the mouth of the input line and the accumulator, and the diaphragm operates a pressure switch which controls a feed pump connected to the input line.

(b) Description of the Prior Art

A water supply system of this type is described in German Auslegeschrift No. 1,459,543, and has a diaphragm arranged in a separate housing which divides the housing into two chambers. The two chambers are connected via connecting lines to a supply line leading to the accumulator and to the consumer installation. The constriction so provided in the supply line brings about a pressure difference which acts on the diaphragm via the two connecting lines and actuates the former. A valve cone is connected to the diaphragm which cooperates with a valve seat formed at the line leading to the pressure switch. To make this water supply system operable, a check valve is required which prevents the water from flowing back under pressure generated by the accumulator after the feed pump is switched off.

It is an object of the invention to combine, in a water supply system of the type just described, several functions in one and to simplify the mechanical design.

SUMMARY OF THE INVENTION

According to the invention, the above stated problem is solved by arranging the diaphragm directly in the delivery flow of the water and providing it with an opening the size of which, relative to the delivery of the pump, is such that a pressure drop accompanied by a pressure difference is produced at the passage opening. A check valve is located on the side of the diaphragm nearest the accumulator and above the flow opening, and is under the influence of a spring force directed toward the diaphragm. A line leading to the pressure switch is also provided which has a mouth placed above the diaphragm surface at a distance which permits the diaphragm, if deflected by a pressure difference, to rest against the mouth and close it off. This diaphragm forms the seat for the check valve and also serves to directly shut off the pressure sensing line leading to the pressure switch. A separate valve body is thus not required and a considerable saving of space results. A support ring is placed on the side of the diaphragm facing away from the accumulator, concentric with the flow opening, and providing a satisfactory seal between the accumulator and the input line.

In order to insure that the feed pump is switched off when there is only a small residual flow through the system, the check valve is provided with a small opening; this small opening has an unloaded cover seating with back-pressure. The closing of the check valve occurs at a residual flow level established by the size of the opening, permitting the diaphragm to move off the mouth of the line leading to the pressure switch. The pump pressure, which is higher at this residual flow, can then reach the pressure switch and turn off the feed pump.

Excessive deformation of the diaphragm by the difference in pressure which it experiences is prevented by placing it between two stops which limit its excursion. Advantageously, the upper stop consists of a perforated plate and the lower stop comprises the bottom of the housing, which has suitable depressions communicating with each other and with the input line. This eliminates an assembly requirement for the lower stop. The depressions are conveniently connected with each other and to the input line by making them in the form of grooves extending concentrically and radially with respect to the input line so that they intersect each other and the input line.

According to another aspect of the invention, it is unnecessary to set the response pressure at which the pressure switch responds exactly. To this end, the pressure switch includes a limit switch (feeler) which is actuated via a leaf spring and the leaf spring is engaged by a plunger connected to a diaphragm body; the pressure sensing line leads from the main diaphragm into a space bounded by the sensing diaphragm body. The tension of the leaf spring determines the closing pressure. Changing the closing pressure is made possible by means of a supplemental spring which acts on the leaf spring and can be brought into and out of engagement with the leaf spring by means of an adjusting member. If the supplemental spring is brought into engagement with the leaf spring, a higher closing pressure is required to operate the limit switch and switch on the feed pump. If the supplemental spring is out of engagement, the limit switch is actuated at a lower pressure.

DETAILED DESCRIPTION OF THE INVENTION

Figure 1:
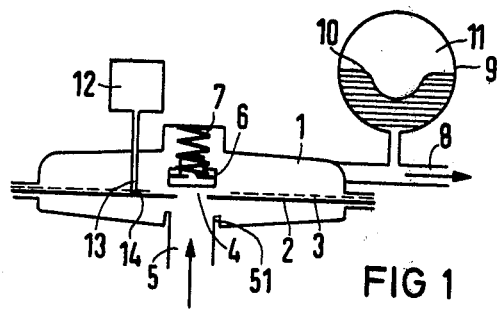
FIG. 1 is a diagrammatical representation of a pressure regulated water supply system illustrating the teachings of the invention.

A two-part housing 1 between the two halves of which a diaphragm 2 is clamped, is shown in FIG. 1. A perforated plate 3 is provided above the diaphragm 2, which limits the upward excursion of diaphragm 2. Diaphragm 2 is made of an elastic material such as rubber or a synthetic. The diaphragm itself has a passage or flow opening 4 through which the water stream arrives via the input line 5 from the feed pump. A check valve 6 is arranged above the diaphragm opening 4 and is pushed towards the opening 4 by the force of a spring 7 to close it when the feed pump is shut off. Then, under the pressure of spring 7, diaphragm 2 rests against a support ring 51 which is disposed concentrically around the input line 5. An output line 8, which leads to the consumer, is further connected to housing 1 and also to an accumulator 9. Accumulator 9 contains a gas chamber 11 which is divided off by a rolling diaphragm 10.

A pressure switch 12 is also contained in housing 1 and has a connecting line or duct 13, which is brought to diaphragm 2. In the rest condition of diaphragm 2, i.e., with the feed pump switched off, there is a small distance 14 between the mouth of line 13 and the surface of the diaphragm. This distance is so designed that when the diaphragm is deflected by the water flow, it rests against the mouth and closes it.

Figure 2:
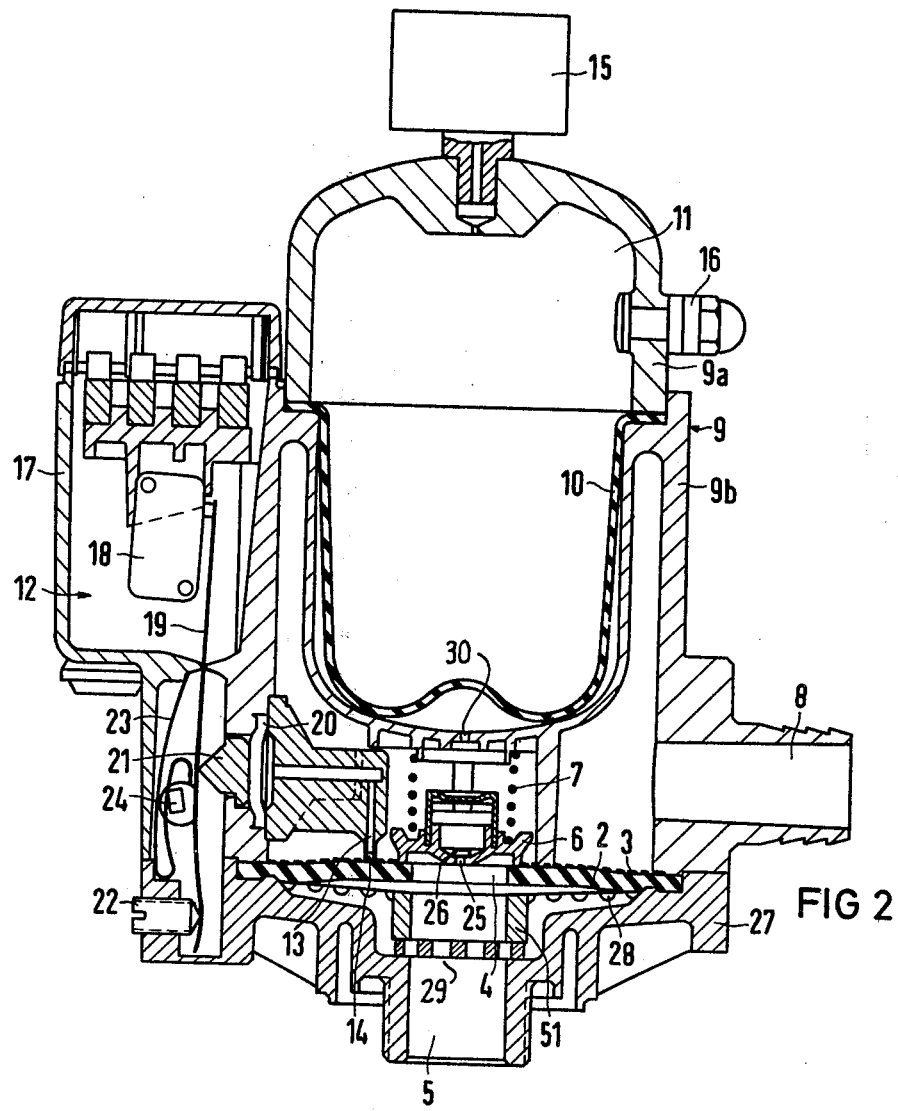
FIG. 2 is a view in cross-section of a pressure regulated water supply system fabricated in accordance with the teachings of the invention.

In the embodiment shown in detail FIG. 2, the components corresponding to the parts diagrammatically shown in FIG. 1 have the same reference symbols; these components therefore will not be explained again. The parts in FIG. 2 which are provided in addition to those in FIG. 1 will now be described. A manometer 15 is connected to gas chamber 11 of accumulator 9 as well as a valve 16. Air can be pumped via the valve 16 into the gas chamber 11 by means of an air pump whereby the desired storage pressure, as measured by the manometer, can be obtained. The rolling diaphragm 10 is clamped between upper and lower housing halves 9a and 9b of accumulator 9 and separates air pressure chamber 11 from the water.

A housing pocket 17 is formed onto the housing of the accumulator 9 and contains the individual components of pressure switch 12. The switching member of the pressure switch 12 is a limit switch 18 which is actuated by the free end of a pivoted leaf spring 19. A limit switch (feeler) will be understood to be a switch with a snap contact, such as a microswitch. Leaf spring 19, in turn, is flexed by a plunger 21 coupled to a pressure switch diaphragm body 20 exposed on one side to the pressure prevailing in the water supply system. The tension of the leaf spring and, thereby, the desired closing pressure can be adjusted by means of set screw 22 which supports the opposite end of the spring. A supplemental spring 23 is also mounted in housing pocket 17; it can be lifted from the leaf spring 19 or brought into contact with it by means of an eccentric 24 which can be set from the outside of the housing. Depending on whether the supplemental spring 23 rests against the leaf spring 19 or not, the limit switch 18 is actuated by the leaf spring at a higher or at a lower pressure. A feed pump which is arranged in the input line 5, but is not shown in the drawing, is switched on and off by means of a limit switch 18.

Check valve 6 contains a small opening 25 which can be closed off by a back-pressure actuated clapper valve (flap trap) 26.

Diaphragm 2 and perforated plate 3, which limits the upward excursion of diaphragm 2, are clamped together between the lower housing half 9b and a closing cover 27 which is fastened to the lower housing. The inside bottom of closing cover 27 is provided with circular grooves 28 which are concentric with input line 5. In addition, radial grooves, not visible in the drawing, are provided which are connected to input line 5 and cross the circular grooves 28. Thus, the pressure prevailing in the input line 5 can be distributed under the diaphragm 2 and push it upward.

The system works as follows: when water is taken from the system via output line 8, the pressure in the system drops as does the pressure communicated to pressure sensing diaphragm 20. As the pressure drops further, the force of leaf spring 19 exceeds the force acting on diaphragm 20 and plunger 21 is pushed to the right. The end of leaf spring 19 resting against the actuator of limit switch 18 then moves to the left, actuating limit switch 18, and the feed pump is switched on. The oncoming flow of water lifts check valve 6 off of flow opening 4 in diaphragm 2; the water thus can flow through opening 4. The pressure drop brought about by the flow lifts the diaphragm 2, so that the latter is pressed against the mouth of line 13, closing it off. The pressure sensing diaphragm 20 is thereby decoupled from the water supply system and can no longer change the position of leaf spring 19. A part of the water reaches the space below rolling diaphragm 10 by way of opening 4 and opening 30 and presses diaphragm 10 upward, compressing the gas in pressure chamber 11 and maintaining the pressure in the system. The remaining part of the water flows from input line 5 through perforated plate 29 and diaphragm opening 4. Under the force of in-flowing water, check valve 6 remains off of its seat on diaphragm 2, and the water flows past check valve 6 into output line 8.

After the output of water ends, the feed pump continues to run and builds up pressure in the system again by pumping water into accumulator 9. This pushes rolling diaphragm 10 upward and compresses the air in gas chamber 11. As this pressure builds up, the flow velocity decreases and the force of spring 7 eventually pushes check valve 6 into contact with diaphragm 2 and back into its starting position.

To insure that a small residual flow continues until the feed pump is switched off, a small opening 25 is provided in check valve 6. When the definite, small flow rate permitted by opening 25 is attained, seating of check valve 6 against diaphragm 2 occurs. A small amount of water continues to flow through opening 25.

The force of spring 7 acting on check valve 6 pushes diaphragm 2 down against support ring 51. The mouth of pressure sensing line 13 is thus opened, permitting the pressure prevailing in the system to again be communicated to sensing diaphragm body 20. Since a high pump pressure now prevails, leaf spring 19 is pushed to the left by plunger 21, driven by diaphragm 20, and the spring end resting on the actuator of limit switch 18 is lifted off. Thereupon, the switch 19 snaps into its other position, switching the feed pump off. After the feed pump is switched off, check valve 26 is pushed by the pressure prevailing in the water supply system against the opening 25 and closes it.

In the water supply system described, the diaphragm 2 forms the seat for the check valve 6 and also directly closes the line 13 leading to the pressure switch. Therefore, no separate components are required for closing line 13. A substantial saving of overall space is thus achieved.

Decoupling the pressure sensing diaphragm body 20 from the water supply system while water is being taken out and using a limit switch has the advantage that a particular switching-off pressure need not be adjusted. The switching-off pressure need merely meet two conditions: it must be above the switching-on pressure and below the maximum pressure of the feed pump. The first condition, that the switching-off pressure be above the switching-on pressure, is established by arranging for reversal of position of leaf spring 19 by diaphragm body 20 during the switching-off operation. This can occur only at a pressure which is higher than that at which the leaf spring 19 moved the diaphragm body 20 to the right. This arrangement of the pressure switch 12 basically fulfills the condition that the switching-off pressure be higher than the switching-on pressure. This condition is also true when supplemental spring 23 is brought into engagement with leaf spring 19 by the eccentric 24.

What is claimed is:

1. A pressure regulated water supply system comprising:
   an accumulator arranged between an input line and an output line leading to a consumer installation;

a pressure switch responsive to a pressure difference between the mouth of the input line and the accumulator for switching a feed pump connected to the input line on and off;

a diaphragm in the path of the input water having a flow opening whose size relative to the delivery of the pump is such that a pressure drop resulting in a pressure difference occurs at the flow opening;

a check valve for closing the flow opening acted upon by a force directed toward the diaphragm; and a duct having a mouth leading to the pressure switch disposed on the side of the diaphragm facing the accumulator, the distance of the mouth from the surface of the diaphragm being such that the diaphragm, when deflected by a pressure difference, rests against the mouth and closes it.

2. A water supply system in accordance with claim 1, further comprising a support ring arranged concentrically with the flow opening on the side of the diaphragm facing away from the accumulator.

3. A water supply system in accordance with claim 1 further comprising a small opening in the check valve which can be closed off by an unloaded back-pressure cover.

4. A water supply in accordance with claim 3 further comprising two stops for limiting excursion of the diaphragm.

5. A water supply system in accordance with claim 4 in which the upper stop consists of a perforated plate and the lower stop comprises the bottom of a housing whose inside surface is provided with depressions connected to each other and to the input line.

6. A water supply system in accordance with claim 5 in which the depressions are radial and concentric to the input line.

7. A water supply system in accordance with claim 1 further comprising:

a second diaphragm coupled to the duct and responsive to pressure communicated by the duct for activating the pressure switch; and the pressure switch comprising a plunger connected to the second diaphragm, a leaf spring flexed by the plunger, and a limit switch actuated by the leaf spring.

8. A water supply system according to claim 7 further comprising a supplemental spring and an adjusting member for bringing the supplemental spring into and out of active engagement with the leaf spring.

* * * * *